A-C TO D-C CONVERTER

Filed Aug. 12, 1966 4 Sheets-Sheet 1

INVENTOR.
DANIEL M MITCHELL
BY
Moody and Phillips
ATTORNEYS

INVENTOR.
DANIEL M MITCHELL
BY
Moody and Phillion
ATTORNEYS

INVENTOR.
DANIEL M. MITCHELL
BY Moody and Phillion
ATTORNEYS

April 30, 1968 D. M. MITCHELL 3,381,203

A-C TO D-C CONVERTER

Filed Aug. 12, 1966 4 Sheets-Sheet 4

INVENTOR.
DANIEL M MITCHELL
BY Moody and Phillion
ATTORNEYS

United States Patent Office 3,381,203

Patented Apr. 30, 1968

3,381,203

A-C TO D-C CONVERTER

Daniel M. Mitchell, Marion, Iowa, assignor to Collins Radio Company, Cedar Rapids, Iowa, a corporation of Iowa Filed Aug. 12, 1966, Ser. No. 572,122

7 Claims. (Cl. 321—8)

This invention relates generally to A-C to D-C converters employing transistors, and more specifically, to an A-C to D-C converter operable over a wide magnitude of input signals with substantial linearity maintained over such range; particularly at the lower signal levels thereof, by circuit means which provide to the converter a bias voltage derived from the input signal and which increases in magnitude up to a maximum value in accordance with the increase in amplitude of the applied input signal.

In present-day electronic equipment there is a need for A-C to D-C converters (rectifiers) which operate with substantial linearity over a wide range of amplitudes as, for example, from 50 millivolts to 5 to 10 volts. There is very little problem involved in obtaining substantial linear operation of the rectifier over ranges of amplitudes extending from 200–300 millivolts and up. However, in the range of 50 millivolts to about 200 millivolts there is a problem of maintaining linearity. Linearity is defined herein as meaning that the magnitude of the D-C output voltage of the rectifier varies directly proportional with the peak-to-peak amplitude of the input signal, which presumably is a sine wave. It is further to be understood that absolute linearity is not obtained in the present invention. However, a substantial improvement in linearity is obtained over known prior art circuits.

There are many prior art devices for converting A-C to D-C voltages, the simplest of which, perhaps, is a single diode. However, at low voltages there is a decided lack of linearity since the diode has a forward voltage drop that must be overcome before a linear range of operation is obtained. If the base emitter junction of a transistor is used as a rectifier instead of a diode, some correction for the forward drop of the PN junction of the transistor can be obtained by biasing the base emitter electrode of the diode just at its threshold of operation.

Biased in such a manner, any positive base current generated by an input source supplied to the base will immediately produce an output. However, if bias level is slightly too low, the output response will not be immediate because the signal must first push the transistor into the cutoff region, thus introducing some nonlinearity at low voltages. If the bias level is slightly too high, the response will not be immediate because for very low signals the transistor will operate in the Class A mode and the average D-C output will be the same as if no input A-C signal had been applied. Therefore, it can be seen that for small amplitude signals the bias level supplied to the transistor base is extremely critical and, because of the temperature sensitivity of transistors, is almost impossible to maintain within the tolerances required in today's high quality, high precision electronic gear.

A primary object of the present invention is to produce or provide an A-C to D-C converter employing transistors in which substantial linearity is obtained at low level input signals.

A second purpose of the invention is to provide an A-C to D-C converter in which a biasing voltage is provided for overcoming the voltage drop of the PN junction of the transistor at low level input signals; said biasing voltage being derived from said input signals to produce substantial linearity of operation over the range of said low-level input signals.

A third purpose of the invention is to provide an A-C to D-C converter employing transistors in which the biasing voltage for said transistors is derived from the input signal to be converted and in which the amplitude of said biasing signal increases as a function of the increase of the input signal over the low-level range of said input signals to provide substantial linearity of operation over said low-level range.

A fourth object of the invention is the improvement of A-C to D-C converters, generally.

A fifth object of the invention is an A-C to D-C converter having a substantial linearity of operation over a wide amplitude range of input signals including relatively low-level input signals.

In accordance with the invention, there is provided a rectifying stage comprising a transistor having a base electrode, an emitter electrode, and a collector electrode. The input signal to be rectified is supplied to said base electrode through a first capacitive means. Also supplied to said base electrode is a D-C biasing voltage which is derived from said input signal. The circuit for deriving such D-C biasing signal is comprised of a high-gain amplifier to which the input signal is supplied and amplified. The output of the high-gain amplifier is then supplied to a circuit which functions as a detector circuit and which can be a transistorized amplifier (NPN type transistor) biased just into the area of saturation. The negative half-cycles of the output of the high-gain amplifier will function to drive the detector into cutoff, thus producing at the output of said detector, a two-level signal with the transitions occuring at substantially the zero crossover points of the input signal supplied to the high-gain amplifier.

It is to be noted that such transition levels will occur only at the zero crossover points of the applied input signal at levels of said input signal above a given threshold value. It is apparent that for very small values of input signal, the output of the high-gain amplifier will be insufficient to completely cut off the detector stage. Furthermore, not only will the output of the high-gain amplifier be insufficient to cut off the detector stage, but the duty cycle of a signal supplied from the high-gain amplifier to the detector stage will be less than 180° of the input signal. More specifically, with a very small input signal level, less than full 180° half cycles of the input signal will be supplied to the detector stage to cut off said detector. Consequently, it can be seen that with very low-level input signal the output of the detector stage will not only be decreased in amplitude but each pulse generated therefrom will have a shorter duration. Filtering circuit means including said first capacitive means connects the output of said detector to the input of the rectifying stage. Such filter circuit functions to convert the output pulses from the detector stage into a D-C voltage whose magnitude is proportional to the amplitude and width of the output pulses from said detector.

Thus it can be seen that with low-level input signals, the biasing voltage will increase as a function of the amplitude of said low-level input signals. However, the output of a detector will reach a maximum at some predetermined level of input voltage so that the biasing voltage will increase no more. At this point, by design, the biasing voltage will have become slightly greater than the voltage drop of the PN junction of the rectifying transistor.

In accordance with a feature of the invention, a thermistor is employed in the output of the detector circuit, the resistance of said thermistor increasing as temperature decreases, which temperature characteristic is the same as that manifested by the PN junction of the transistor of the rectifying stage. By proper selection of the thermistor, variations of the voltage drop of the PN junction of the rectifying stage due to temperature can be compensated for quite precisely by the thermistor.

The above-mentioned and other objects and features of the invention will be more fully understood from the following detailed description thereof when read in conjunction with the drawings in which.

Figure 8:
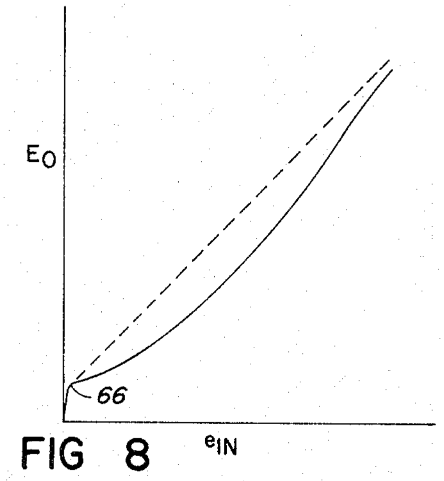
Figure 9:
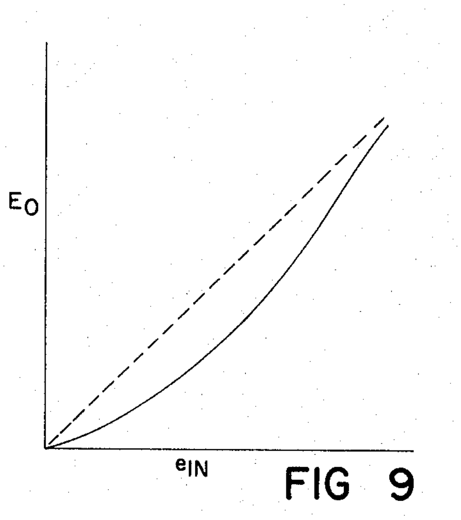
Figure 10:
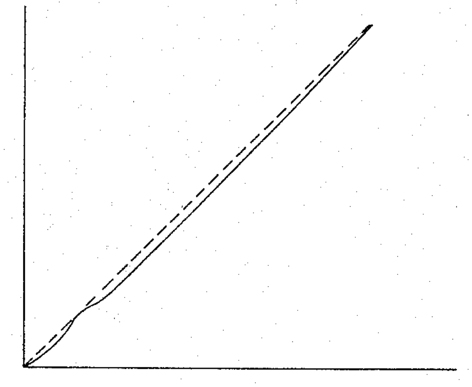
Figures 5, 6, 7:
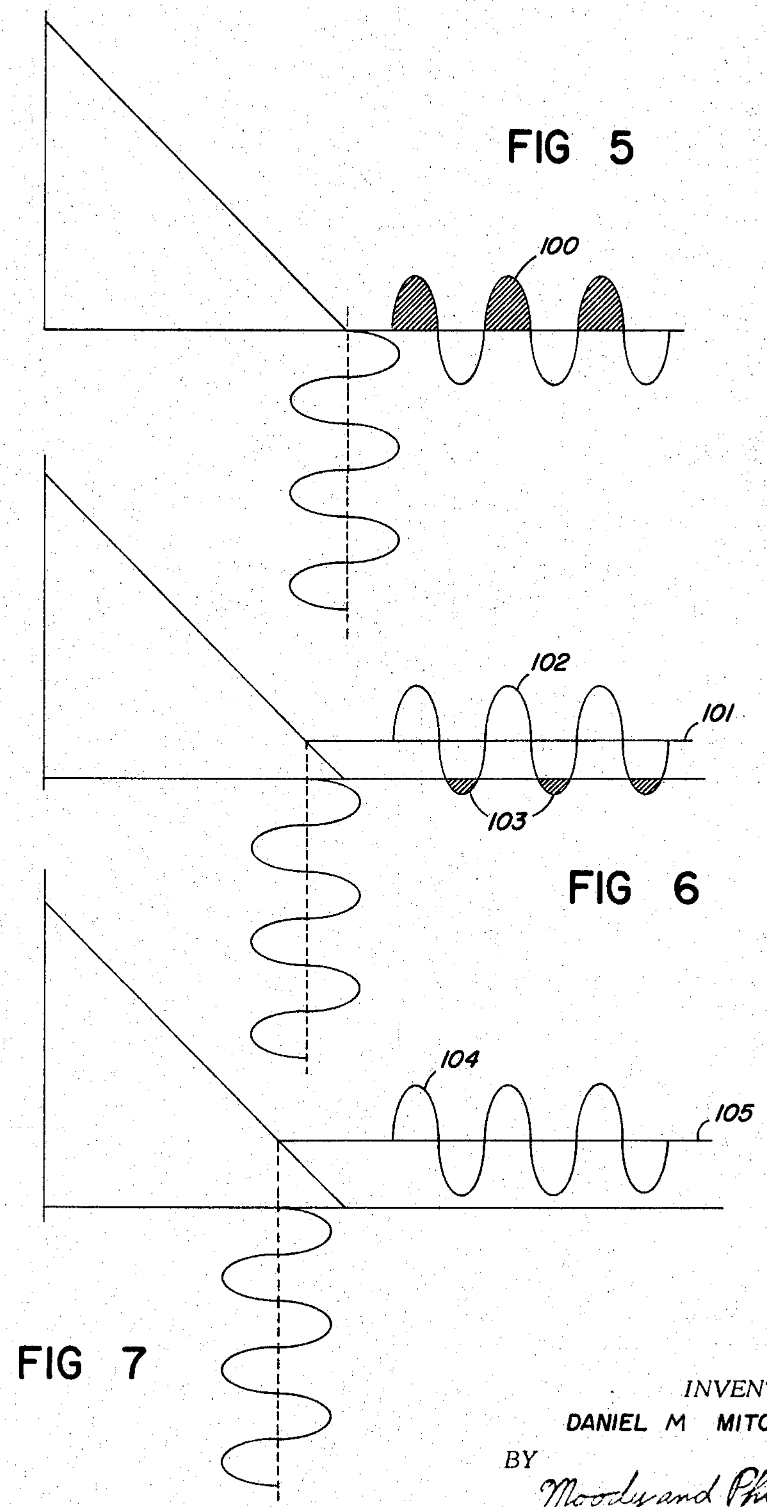

FIGS. 5, 6, and 7 are voltage waveforms illustrating how nonlinearity is introduced into the output of an A-C to D-C converter, particularly over the range of low ampltiude input signals; and FIGS. 8, 9, and 10 are curves showing the relation between input voltage and output voltage when the D-C bias is increased too rapidly, too slowly, or at about the proper rate.

Figure 2:
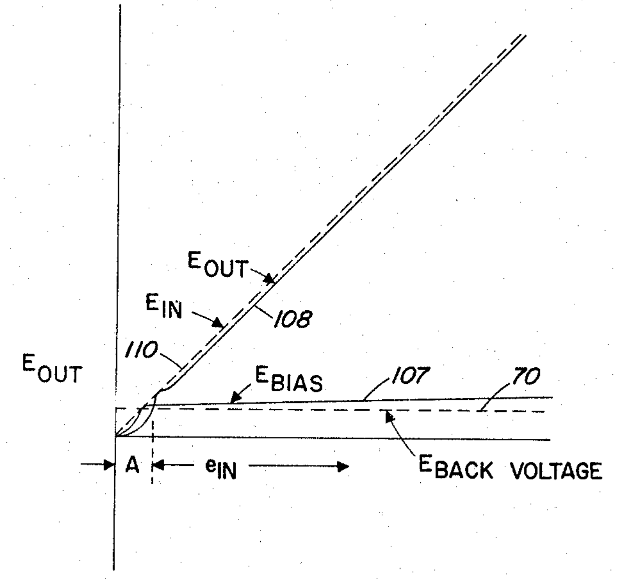
FIG. 2 is a set of curves showing the relation between input voltages, output voltages, and biasing voltages employed in the circuit of FIG. 1.

Generally speaking, the overall linearity of an A-C to D-C converter is determined by the relation of the output voltage amplitude to the A-C input voltage amplitude. The overall linearity of the present invention is shown in FIG. 2 wherein curve 110 represents the input signal, curve 108 represents the output voltage of the circuit, curve 70 represents the voltage of the PN junction of the rectifying transistor, and curve 107 represents the generated D-C bias for overcoming the PN junction voltage. At low input voltages particularly, there are two major factors which determine the magnitude of the output voltage. One of these two factors is the input voltage itself, and the second factor is the biasing voltage supplied to the base of the transistor. More specifically, even before the applied biasing voltage has overcome the voltage drop of the PN junction, the output voltage of the emitter will have begun to rise. In other words, the emitter voltage will tend to rise along with the base voltage even though the base voltage is still below cutoff value. Consequently, in the present invention as the biasing voltage begins to build up from zero value, with increasing input voltage, D-C output voltage of the rectifier will begin to increase; at first, due solely to the biasing voltage itself and then shortly thereafter, but still at a low level of input signal, due to both the biasing voltage and also to the input signal. The foregoing concept is important in that the effect of a rise in bias voltage, even in the cutoff region, will produce a rise in the output of the rectifying transistor, a factor which must be considered in the overall linearity of the circuit operation. More discussion of the above will appear later in the specification.

Figure 1:
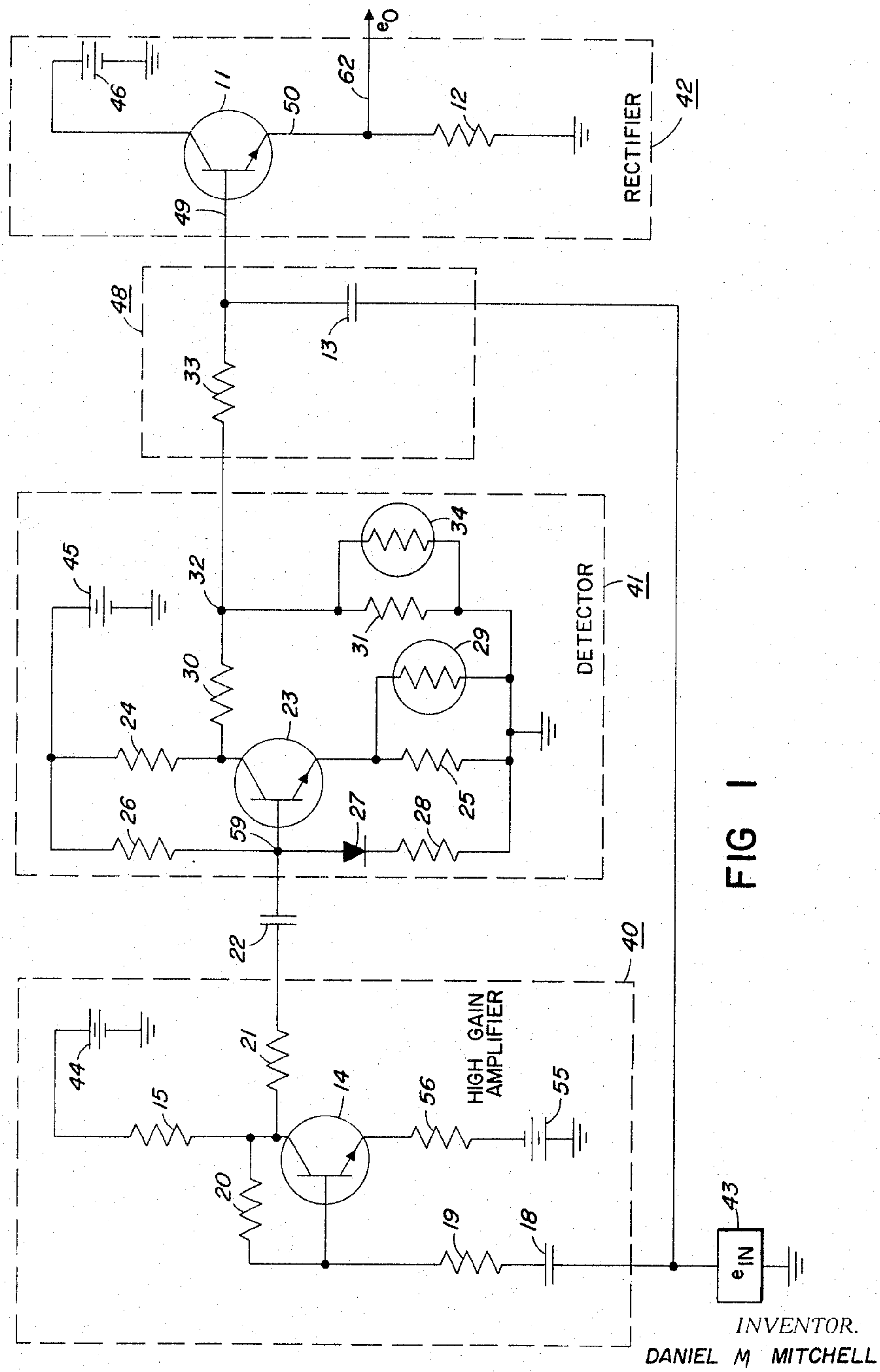
FIG. 1 is a schematic diagram of the invention.

Referring now to FIG. 1, the input signal to be rectified is supplied from source 43 to two inputs. The first of these inputs is the base of rectifying transistor 11 through lead 100 and capacitor 13. The second of these two inputs is to the base of high-gain amplifying transistor 14 through the series combination of capacitor 18 and resistor 19. The output of high-gain amplifier 40 is supplied via the series combination of resistor 21 and capacitor 22 to the base of transistor 23, which transistor forms a part of the detector circuit and in its quiescent stage is biased at a point just inside its saturation area.

The output of detector circuit 41 is supplied to filter circuit 48 which comprises resistor 33 and capacitor 13. From filter circuit 48 the resulting D-C biasing voltage is supplied directly to the base of rectifying transistor 11 and functions to bias said transistor to overcome the potential drop of the PN junction across base 49 and emitter electrode 50.

Figure 4:
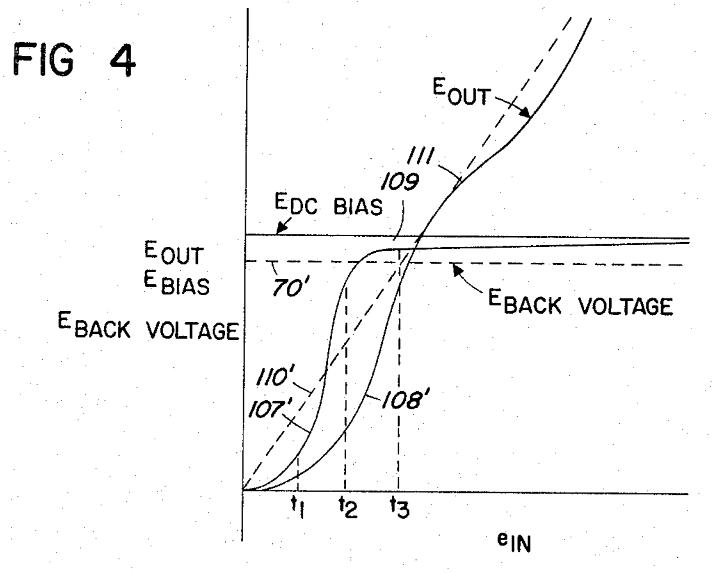
FIG. 4 is a blown-up portion of the chart of FIG. 2 showing the voltage relationships over the range of input signals of small amplitudes.

It can be seen from the circuit of FIG. 1 that at very low levels the output of high-gain amplifier 40 will be insufficient to drive the normally saturated transistor 23 into complete cutoff. Thus the output of transistor 23 which is supplied to the filter circuit 48, will, at low-level input amplitudes, vary in accordance with some function of the amplitude of the input signal from source 43. Such variation is shown in the curve of FIG. 4, which is a blown-up view of a portion of the curves of FIG. 2, and which will be discussed in more detail later. For the time being it should be noted that the curve 108′ of FIG. 4 represents the output voltage appearing at the emitter of transistor 11 and the voltage curve 107′ represents the D-C voltage generated at the base 49 of transistor 11. From FIG. 4 it can be seen that the biasing voltage 107′ starts at zero, as does the input voltage represented by curve 110′. At low levels of the input signal it can be seen in FIG. 4 that the generated bias voltage (curve 107′) initially grows at a slower rate than the input voltage (curve 110′), but very quickly is caused to increase at a faster rate, beginning at time $t_1$ and continuing until approximately time $t_3$. At time $t_3$ the amplitude of the input signal is sufficiently large, after amplification by amplifier 40, to drive the tube 23 into the cutoff region, so that biasing voltage 107′ levels off.

Some additional discussion of the curves of FIG. 4 will be set forth later. Before such discussion, however, the detailed operation of the circuit of FIG. 1 will be described.

The input signal from source 43 is supplied to the base of transistor 14 through the series combination of capacitor 18 and resistor 19. The collector thereof is connected to positive battery source 44 through resistor 15 and the emitter thereof is connected to negative battery source 55 through resistor 56. Resistor 20, which connects the collector of transistor 14 to the base thereof, is a standard feedback circuit which allows the D-C bias of transistor 14 to be comparatively temperature stable.

As stated above, the output of transistor 14 is supplied from the collector thereof through resistor 21 and capacitor 22 to the base of transistor 23. Under normal quiescent conditions the transistor 23 is biased just into its saturated state by means of resistor 26, diode 27, and resistor 28, which are connected between the positive battery source 45 and ground with a tap 59 thereon connected to the base of transistor 23. The diode 27 performs a temperature compensation function in that it has a negative temperature characteristic similar to that of the PN junction of transistor 23.

Collector resistor 24 connects the collector of transistor 23 to battery source 45 and the parallel combination of resistor 25 and thermistor 29 connects the emitter of transistor 23 to ground. Thermistor 29 functions to compensate for a change of beta in transistor 23 due to a temperature change. The beta of a transistor is defined as the ratio of emitter current to base current and as temperature decreases, beta decreases; conversely, as temperature increases, beta increases. Thus, with an increase of temperature the ratio of emitter current to base current increases and it appears as if the impedance presented to the base has increased. To compensate for such apparent impedance increase the impedance of thermistor 29 decreases as temperature increases.

As mentioned above, transistor 23 in its quiescent state, i.e., without an output signal being supplied thereto from the high-gain amplifier 40, is biased just into saturation state. Consequently, a negative output signal from transistor 14 will tend to drive the transistor 23 towards cutoff. Since amplifier 40 is a high-gain amplifier, a relatively small input signal supplied to transistor 14 from source 43 will function to drive transistor 23 completely into its cutoff area. However, there is a range of small input signal values, as discussed above, which is insufficient to drive transistor 23 completely into the cutoff area. Such an area is shown in the curves of FIG. 4, between times $t_1$ and $t_3$, as described above.

The output from detector 41 is supplied from the collector of transistor 23 into filter circuit 48, and consists of a series of positive pulses, one of which occurs each time the transistor 23 is driven towards cutoff. Such positive pulses are filtered by filter circuit 48 to form the D-C biasing voltage applied to base of rectifying transistor 11.

As discussed hereinbefore, the application of a D-C bias to the base 49 of transistor 11 will produce an increase in the output potential of the emitter thereof, even though the biasing voltage is less than the voltage drop of the PN junction of the transistor 11. The relationship between the bias voltage and the output voltage at such low levels is shown in the curves $V_{C13}$ and $V_{62}$ of FIG. 3, where curve $V_{C13}$ represents the biasing voltage supplied to base 49 of transistor 11 and curve $V_{62}$ represents the voltage appearing on the emitter electrode as the result thereof. The axis of the curves of FIG. 4 are in millivolts of input voltage supplied from source 43 of FIG. 1, and the ordinate is in D-C millivolts.

The above effect must be considered in the overall linearity of operation of the circuit along with the increase in output voltage due to the effect of the input signal from source 43 of FIG. 1. In other words, the effect of the curve $V_{C13}$ of FIG. 3, the effect of the input signal curve 110 of FIG. 4, and the effect of larger biasing voltages represented by the curve 107 of FIG. 4 must all be considered in determining the overall linearity of operation of the circuit.

Superimposed upon the D-C bias supplied to the emitter of transistor 11 is the A-C input supplied from source 43 of FIG. 1 through capacitor 13. To obtain optimum results, i.e., the most linear results possible, there must be a certain correlation between the rise of the D-C bias and the magnitude of the input signal from source 43. To illustrate why such a correlation is necessary, reference is made to FIGS. 5, 6, and 7.

To obtain what might be regarded as perfect rectification, the transistor 11 should always be biased just exactly at the point of cutoff as illustrated in FIG. 5 so that all positive half cycles, such as half-cycle 100, will produce a corresponding half-cycle on the output lead 62 of rectifier 42. However, as discussed above, such perfect biasing of transistor 11 is not feasible.

If the biasing of base 49 of transistor 11 is too large so that a quiescent D-C output signal such as represented by line 101 of FIG. 6 is produced, then the superpositioning of an A-C input 102 upon the base 49 will result only in an increase of the output signal in an amount represented by the shaded areas 103 in FIG. 6.

If the biasing of the base 49 is even greater, then, as shown in FIG. 7, operation of the circuit could be obtained where the A-C signal adds nothing to the D-C output voltage appearing on output lead 62. More specifically, the A-C component 104 of the output signal simply varies the already existing D-C output 105 and adds nothing to the total D-C component.

Figure 3:
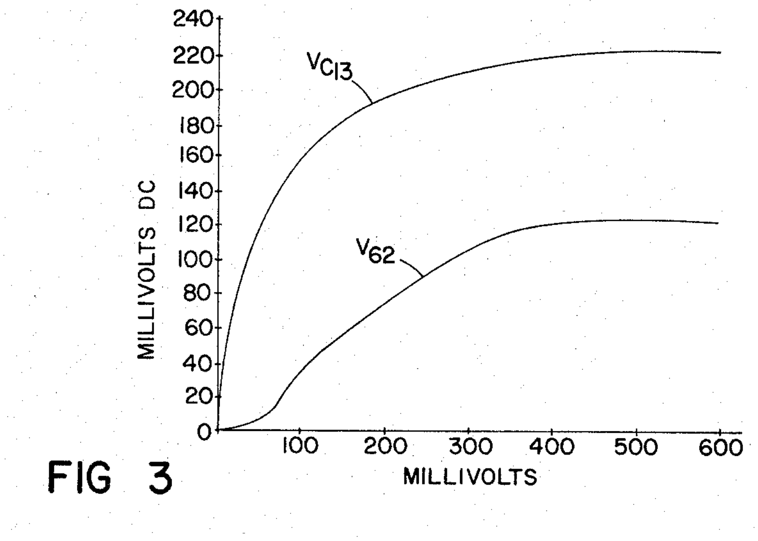
FIG. 3 is two curves showing a relationship between bias voltage and emitter voltage in the cutoff region of the rectifying transistor.

Thus it can be seen that if the biasing voltage represented by the voltage $V_{C13}$ of FIG. 3 (which is also the curve 107 of FIG. 4) is increased too rapidly to a value greater than the voltage drop to the PN junction of transistor 11, nonlinearity will result. Worded in another way, the increase in the biasing potential must be at such a rate that by the time it reaches the value of the voltage drop in the PN junction of transistor 11, the magnitude of the input signal from source 43 of FIG. 1 will be so large that comparatively little distortion will result from the fact that the biasing voltage is not exactly equal to the voltage drop of the PN junction transistor 11.

In FIG. 8 there is shown a characteristic curve of the input voltage vs. the output voltage of the circuit of FIG. 1; when the D-C bias on base 49 of transistor 11 is brought up too rapidly in relation to the increase of magnitude of the input signal. The output voltage rises rapidly due to the increase in biasing voltage up to the point 66, at which time the biasing voltage reaches a near maximum, such maximum ordinarily being slightly greater than the voltage drop of the PN junction of transistor 11. However, at this time the input voltage is still comparatively small and the type operation shown in FIG. 6 is obtained around point 66 in FIG. 8 so that the increase in the output voltage falls off. As the input voltage continues to increase, the rate of increase of the output voltage will increase, as shown in FIG. 8.

On the other hand, if the D-C biasing voltage is increased too slowly, the result shown in FIG. 9 is shown. The total response curve simply lags, i.e., the D-C output voltage of rectifier 42 lags behind the input voltage. A compromise between the operation shown in FIGS 8 and 9 is illustrated in FIG. 10, where the increase of biasing voltage and the increase of input signal have a relation which will produce the maximum linearity.

It has been found that to obtain the best linearity, the rate of rise of the biasing voltage is such that the ultimate value will be slightly greater than the voltage of the PN junction of transistor 11. This relationship is shown clearly in FIG. 4 where the voltage level 70 represents the voltage drop of the PN junction and the curve 107 represents the biasing voltage generated at the base of transistor 11. However, as indicated above, the fact that the biasing voltage is ultimately greater than the voltage drop of the PN junction is relatively unimportant since by the time the biasing voltage reaches its maximum value, the magnitude of the input voltage is sufficiently large so that comparatively little distortion is created.

It is to be understood that the form of the invention as shown and described herein is but a preferred embodiment thereof and that various changes may be made in the circuit arrangement without departing from the spirit or scope thereof.

I claim:

1. An A-C to D-C converter comprising:

a rectifying stage including a first transistor having collector-electrode means, emitter electrode means, base electrode means and, when biased, having a voltage drop across the PN junction of said base and emitter electrodes;

input signal means for supplying an input signal to be rectified;

high gain amplifying means responsive to said input signal to produce an amplified signal;

detector means responsive to said amplified signal to produce a train of pulses whose energy content at low input signal levels is a function of the level of said low level input signals;

means for integrating said train of pulses to produce a D-C biasing signal of a magnitude which is a predetermined function of the level of said low level input signals and whose maximum value is substantially equal to said voltage drop across said PN junction;

means for supplying said D-C signal to said base electrode of said first transistor;

and means for supplying said input signal to said base electrode means.

2. An A-C to D-C converter in accordance with claim 1 in which said detector means comprises:

second transistor means comprising input means and output means;

voltage supply means including biasing means for causing said transistor means to have a quiescent state just inside its saturation range of operation with a first level of output signal therefrom;

means for supplying the output signal of said high gain amplifier to the input means of said second transistor means;

said second transistor means responsive to the output of said high gain amplifier to produce a second level of output signal to cause said train of pulses to be a substantially two-level signal which is supplied to said integrating means;

the duty cycle of said second level being substantially 180° of every cycle of said input signal when said input signal is above a predetermined threshold level and when said input signal is below said predetermined threshold level the duty cycle being less than 180° of every cycle of said input signal by an amount which varies as the amount which said input signal is less than said predetermined threshold level in accordance with said predetermined function;

the parameters of said high gain amplifier and said detector means being constructed to produce said predetermined function with characteristics such that the potential of the emitter electrode of said first transistor responds both to said change in said D-C biasing signal and also to said input signal to produce an optimum linear output signal over the entire operating range of said A-C to D-C converter.

3. An A-C to D-C converter in accordance with claim 1 in which:

said high gain amplifier, said detector means, and said integrating means are constructed to produce said D-C biasing signal which, in cooperation with said input signal, will produce a resultant signal which is supplied to the base of said first transistor;

said first transistor being constructed to respond to said resultant signal to produce an output signal containing a D-C component which is due solely to said D-C biasing signal and which, at low levels of input signal, varies as the level of said D-C biasing signal;

the said D-C component and the component of said output signal due directly to the input signal supplied to said first transistor combining to produce an optimum linearity of operation over the entire range of operation of said A-C to D-C converter.

4. An A-C to D-C converter comprising:

a rectifying stage including a first transistor having collector-electrode means, emitter electrode means, and base electrode means;

input signal means for supplying a signal to be rectified;

D-C signal generating means responsive to said input signal means to produce a D-C biasing signal whose magnitude, at low levels of input signal, varies as a predetermined function of said input signal;

means for supplying said input signal to said first transistor;

said first transistor means, at low levels of said input signal, constructed to respond to said D-C biasing signal to produce a component of output signal which, when combined with the component of output signal produced from said input signal, results in an overall output signal which has an optimum linearity of operation over the entire range of operation of said A-C to D-C converter.

5. An A-C to D-C converter in accordance with claim 4 in which said D-C signal generating means comprises:

high gain amplifying means responsive to said input signal to produce an amplified signal;

detector means responsive to said amplified signals to produce a train of pulses whose energy content at low input signal levels is a function of the level of said low level input signals;

means for integrating said train of pulses to produce said D-C biasing signal.

6. An A-C to D-C converter comprising:

a rectifying stage including a first transistor having collector-electrode means, emitter electrode means, and base electrode means;

input signal means for supplying a signal to be rectified;

D-C signal generating means responsive to said input signal means to produce a D-C biasing signal whose magnitude, at low levels of input signal, varies as a predetermined function of said input signal;

said first transistor means, at low levels of said input signal constructed to respond to said D-C biasing signal to produce a component of output signal which results in an overall output signal having an optimum linearity of operation over the entire range of operation of said A-C to D-C converter.

7. An A-C to D-C converter in accordance with claim 6 in which said D-C signal generating means comprises:

high gain amplifying means responsive to said input signal to produce an amplified signal;

detector means responsive to said amplified signals to produce a train of pulses whose energy content at low input signal levels is a function of the level of said low level input signals;

means for integrating said train of pulses to produce said D-C biasing signal.

References Cited

UNITED STATES PATENTS

| | | | |
|---|---|---|---|
| 3,207,973 | 9/1965 | Smith | 321—18 |
| 3,349,251 | 10/1967 | Wilder | 307—88.5 |
| 3,354,380 | 11/1967 | Fly et al. | 321—18 |

LEE T. HIX, *Primary Examiner.*

W. M. SHOOP, *Assistant Examiner.*